(12) United States Patent
Choi (10) Patent No.: US 9,635,841 B2
(45) Date of Patent: May 2, 2017

(54) LURE

(75) Inventor: Eric Eun-Ha Choi, Fukuoka (JP)

(73) Assignee: DUEL CO., INC., Fukuoka-shi (JP)

(*) Notice: Subject to any disclaimer, the term of this patent is extended or adjusted under 35 U.S.C. 154(b) by 638 days.

(21) Appl. No.: 13/575,973

(22) PCT Filed: Jan. 29, 2010

(86) PCT No.: PCT/JP2010/051187
§ 371 (c)(1),
(2), (4) Date: Sep. 10, 2012

(87) PCT Pub. No.: WO2011/092832
PCT Pub. Date: Aug. 4, 2011

(65) Prior Publication Data
US 2012/0324778 A1    Dec. 27, 2012

(51) Int. Cl.
*A01K 85/16* (2006.01)
*A01K 85/00* (2006.01)
*A01K 85/01* (2006.01)

(52) U.S. Cl.
CPC .............. *A01K 85/16* (2013.01); *A01K 85/00* (2013.01); *A01K 85/01* (2013.01)

(58) Field of Classification Search
CPC ................................. A01K 85/01; A01K 85/00
USPC ................... 43/42.22, 42.31, 42.39
See application file for complete search history.

(56) References Cited

U.S. PATENT DOCUMENTS

| | | | | |
|---|---|---|---|---|
| 5,134,799 | A | * | 8/1992 | Trnka ........................... 43/42.22 |
| 5,561,938 | A | * | 10/1996 | Kato et al. .................. 43/42.22 |
| 5,822,912 | A | * | 10/1998 | Kato et al. .................. 43/42.22 |
| 2003/0093939 | A1 | * | 5/2003 | Salonen et al. ............. 43/42.22 |

(Continued)

FOREIGN PATENT DOCUMENTS

| | | |
|---|---|---|
| CN | 201219435 Y | 4/2009 |
| JP | 63-020766 U | 2/1988 |
| JP | 10-210883 A | 8/1998 |

(Continued)

OTHER PUBLICATIONS

Office Action dated Mar. 14, 2014, issued in Japaese Patent Application No. 2011-551631 with Partial English Translation (4 pages).

(Continued)

*Primary Examiner* — Darren W Ark
*Assistant Examiner* — Morgan T Barlow
(74) *Attorney, Agent, or Firm* — Westerman, Hattori, Daniels & Adrian, LLP (57) ABSTRACT

A lure of the present invention includes a body, a sinker moving spatial portion provided inside the body and extending in an anteroposterior direction of the body, a spherical sinker accommodated in the sinker moving spatial portion to be movable along the sinker moving spatial portion in the anteroposterior direction of the body, and a retainer provided at a front side of the sinker moving spatial portion and can retain the spherical sinker due to magnetic force thereof. A partition is provided between the front portion of the sinker moving spatial portion and the retainer, and the partition has an inclined surface portion that is gradually reduced in thickness from the sinker moving spatial portion toward the retainer. The lure provides a shiftable center of gravity due to movement of a spherical sinker.

5 Claims, 4 Drawing Sheets

(56) References Cited

U.S. PATENT DOCUMENTS

2006/0117641 A1*   6/2006   Kumlin ........................ 43/42.22

FOREIGN PATENT DOCUMENTS

| | | |
|---|---|---|
| JP | 11-341936 A | 12/1999 |
| JP | 11-346601 A | 12/1999 |
| JP | 2000-236779 A | 9/2000 |
| JP | 2005-287360 A | 10/2005 |
| JP | 3133373 U | 7/2007 |
| JP | 2007-209229 A | 8/2007 |

OTHER PUBLICATIONS

International Search Report of PCT/JP2010/051187; mailing date Apr. 13, 2010.
Office Action dated Jun. 6, 2014, issued in corresponding Chinese Patent Application No. 201080062022.0, with English Translation (8 pages).
Chinese Office Action dated May 2, 2013, issued in corresponding Chinese application No. 201080062022.0, w/ partial English translation (7 pages).
Chinese Office Action dated Dec. 10, 2013, issued in corresponding Chinese application No. 201080062022.0, w/ partial English translation (8 pages).
Extended European Search Report dated Jan. 20, 2014, issued in corresponding European application No. 10844594.1 (6 pages).

* cited by examiner

LURE

TECHNICAL FIELD

The present invention relates to a lure that has a shiftable center of gravity due to movement of a spherical sinker.

BACKGROUND ART

Figure 8:
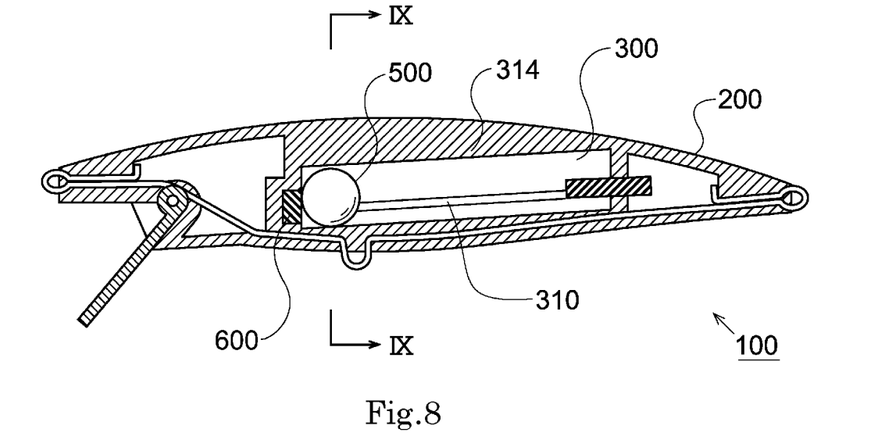
FIG. 8 is a transverse sectional view of a lure according to the conventional art.
Figure 9:
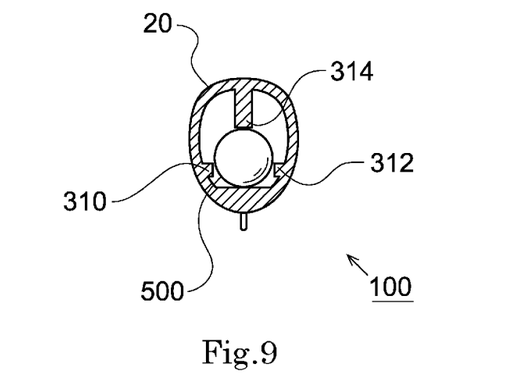
FIG. 9 is a cross-sectional view taken along line IX-IX in FIG. 8.

There has been known a lure disclosed in Patent Document 1 as a conventional art, for example. As shown in FIGS. 8 and 9, such a lure 100 according to the conventional art includes a body 200, a sinker moving spatial portion 300, a steel ball 500 (spherical sinker), and a magnet 600. The sinker moving spatial portion 300 is provided inside the body 200 so as to extend in the anteroposterior direction of the body 200. The steel ball 500 is accommodated in the sinker moving spatial portion 300 and is movable along the sinker moving spatial portion 300 in the anteroposterior direction of the body 200. The magnet 600 is provided at the portion end of the sinker moving spatial portion 300.

The magnet 600 has a surface exposed to the front portion side of the sinker moving spatial portion 300. Accordingly, when the steel ball 500 moves to the front portion of the sinker moving spatial portion 300, the steel ball 500 is directly attached to the surface of the magnet 600 due to magnetic force thereof. The sinker moving spatial portion 300 has side surfaces that are provided with left and right projecting side rails 310 and 312, respectively. Also, the sinker moving spatial portion has an upper surface that is provided with an upper rail 314 projecting downward. These left and right side rails 310 and 312 as well as the upper rail 314 are each formed as a long projection that extends in parallel with a central axis of the sinker moving spatial portion 300.

When the lure 100 is shot, the steel ball 500 is detached from the magnet 600 and moves toward the rear portion of the body 200. Accordingly, the lure 100 flies far away. On the other hand, when the lure 100 reaches the surface of water, the steel ball 500 moves toward the front portion of the body 200 and is attached to be retained at the surface of the magnet 600 due to the magnetic force thereof. When the steel ball 500 is retained at the magnet 600, the front portion of the lure 100 is weighed. When the lure 100 is pulled in this state, the lure 100 swims with the rear portion being swinging to the left and right.

In this manner, in the lure 100 according to the conventional art, the steel ball 500 moves forward and backward in the body 200, so that the center of gravity of the lure 100 is made shiftable.

In the lure 100 according to the conventional art described above, the steel ball 500 moves in the sinker moving spatial portion 300 while being in contact with the distal end surfaces of the left and right side rails 310 and 312 as well as with the distal end surface of the upper rail 314. These rails 310, 312, and 314 prevent displacement in the right-left direction and/or in the up-down direction of the steel ball 500 that moves in the sinker moving spatial portion 300. Furthermore, each rail 310, 312, and 314 prevent displacement in the right-left direction and/or in the up-down direction of the steel ball 500 retained at the magnet 600. The expression "displacement in the right-left direction" refers to a phenomenon that the steel ball (sinker) is shaken in the right-left direction with respect to the central axis of the sinker moving spatial portion. On the other hand, the expression "displacement in the up-down direction" refers to a phenomenon that the steel ball (sinker) is shaken in the up-down direction with respect to the central axis thereof.

However, provision of the respective rails may not always prevent sufficiently such displacement in the right-left direction and/or in the up-down direction of the steel ball 500 attached to the magnet 600. If the steel ball 500 attached to the magnet 600 is displaced in the right-left direction and/or in the up-down direction, the steel ball 500 may be detached from the magnet 600 or may be shaken while the lure 100 is swimming, which may adversely affect the swimming action of the lure 100.

More specifically, a steel ball of any size is generally accommodated in a sinker moving spatial portion in order to set buoyancy of a lure (as mentioned above, the steel ball serves as a sinker of the lure). For example, a steel ball of a large diameter is used if the lure is desired to sink deeper. In contrast, a steel ball of a small diameter is used if the lure is desired not to sink very deep.

In the lure 100 according to the conventional art described above, if a steel ball of a small diameter is accommodated in the sinker moving spatial portion provided with the respective rails that can fit a steel ball of a large diameter, it is not possible to sufficiently prevent displacement in the right-left direction and/or in the up-down direction of the steel ball of the small diameter attached to the magnet. On the other hand, a steel ball of a large diameter cannot be accommodated in the sinker moving spatial portion provided with the respective rails that can fit a steel ball of a small diameter. In other words, the steel ball of such a large diameter needs to be accommodated in the sinker moving spatial portion provided with the rails that each project by a shorter length (the rails that secure a wide gap between the distal end surfaces facing each other). On the other hand, the steel ball of a small diameter needs to be accommodated in the sinker moving spatial portion provided with the rails that each project by a longer length. In this manner, the lure 100 according to the conventional art requires provision of the sinker moving spatial portions 300 that correspond respectively to the steel balls 500 of different diameters.

However, such provision of the sinker moving spatial portions respectively for the steel balls of various sizes, in other words, production of bodies of a plurality of types respectively for the steel balls of the different sizes, leads to increase in production cost for the lure. On the other hand, if a steel ball of a small diameter is accommodated in the sinker moving spatial portion (one sinker moving spatial portion) provided with the respective rails that can fit a steel ball of a large diameter, it is not possible to sufficiently prevent displacement in the right-left direction and/or in the up-down direction of the steel ball of the small diameter attached to the magnet as described above.

[Patent Document 1]

Japanese Unexamined Utility Model Application Publication No. S63-20766 A

It is an object of the present invention to provide a lure including a spherical sinker that is movable so as to shift the center of gravity of the lure, preventing displacement in the right-left direction and/or in the up-down direction of the spherical sinker retained at a front portion, as well as achieving reduction in production cost therefor.

The lure of the present invention includes a body, a sinker moving spatial portion provided inside the body and extending in an anteroposterior direction of the body, a spherical sinker accommodated in the sinker moving spatial portion to be movable along the sinker moving spatial portion in the anteroposterior direction of the body, and a retainer provided at a front portion of the sinker moving spatial portion and can retain the spherical sinker due to magnetic force thereof. A partition is provided between the front portion of the sinker moving spatial portion and the retainer, and the partition has an inclined surface portion that is gradually reduced in thickness from the sinker moving spatial portion toward the retainer.

The preferred lure of the present invention has the partition having a circular hole, and the inclined surface portion is located to surround the circular hole.

In the lure according to the present invention, the spherical sinker retained by the retainer at the front portion of the body is unlikely to be displaced in the right-left direction and/or in the up-down direction. The present invention thus provides the lure that swims with the rear portion being favorably swinging to the left and right. Furthermore, such the lure according to the present invention can be obtained with a relatively low price.

DETAILED DESCRIPTION OF THE INVENTION

Figure 1:
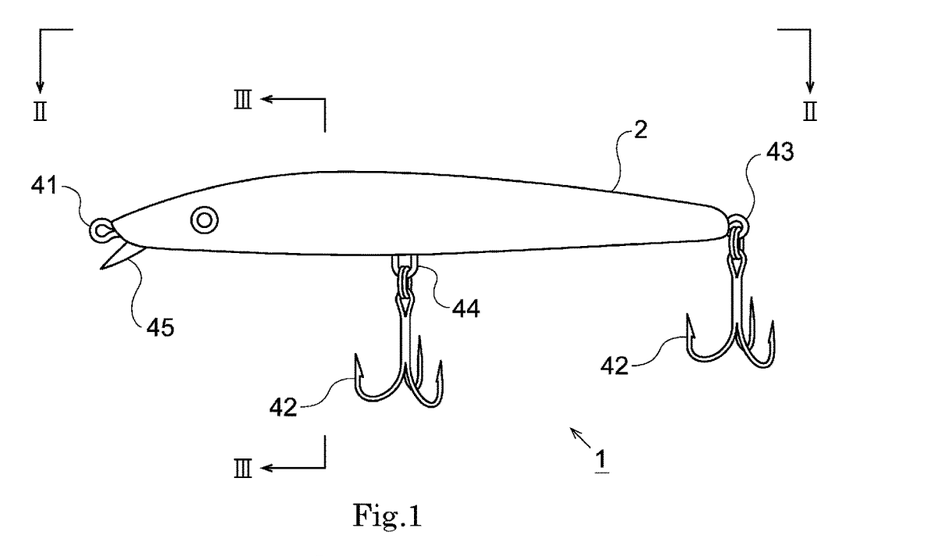
FIG. 1 is a side view of a lure according to an embodiment of the present invention.
Figure 2:
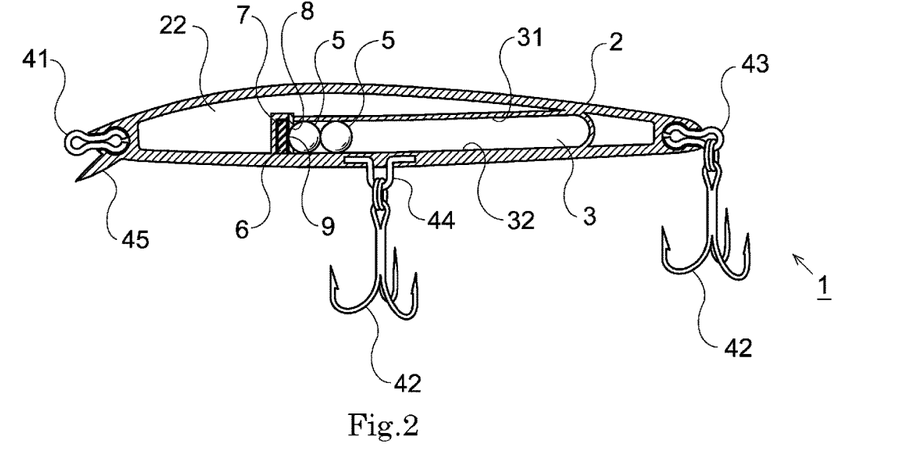
FIG. 2 is a sectional view taken along line II-II in FIG. 1.
Figure 3:
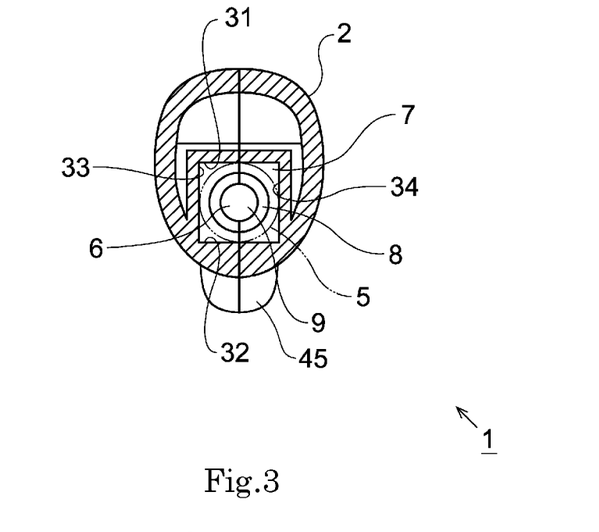
FIG. 3 is an enlarged sectional view taken along line III-III in FIG. 1.
Figure 4:
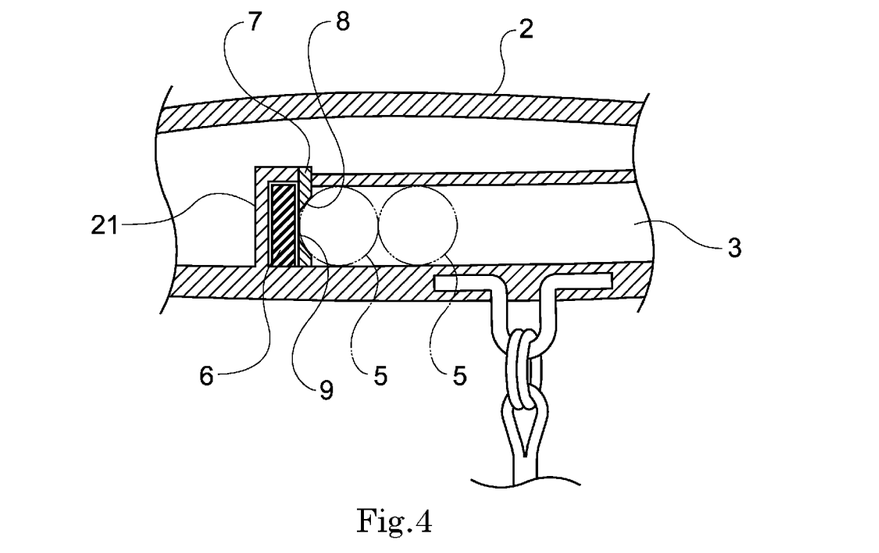
FIG. 4 is an enlarged view showing a partition and the periphery thereof in the sectional view of FIG. 2.

FIG. 1 is a side view of a lure according to one embodiment of the present invention. FIGS. 2 and 3 are sectional views of the lure shown in FIG. 1, which are taken in the up-down direction and in the right-left direction, respectively. FIG. 4 is an enlarged view showing part of the view of FIG. 2. In each of FIGS. 3 and 4, a spherical sinker is outlined with a two-dot chain line.

The lure 1 shown in FIG. 1 to FIG. 4 includes a body 2, a sinker moving spatial portion 3, a spherical sinker 5, a retainer 6 and a partition 7. The sinker moving spatial portion 3 is provided inside the body 2. The spherical sinker 5 is accommodated in the sinker moving spatial portion 3. The retainer 6 is provided at the front side of the sinker moving spatial portion 3. The partition 7 is provided between the front portion of the sinker moving spatial portion 3 and the retainer 6. The partition 7 has an inclined surface portion 8 that is tapered. The inclined surface portion 8 is gradually reduced in thickness from the sinker moving spatial portion 3 toward the center of the retainer 6.

The lure 1 according to the present invention will be detailed individually with reference to the respective components.

The body 2 shown in the figures has an outer shape imitating a small fish. However, the outer shape of the body 2 is not limited to that imitating a small fish. Alternatively, the outer shape of the body 2 may be modified in various manners.

The outer surface of the body 2 may be further provided with a large number of dimples (not shown). Provision of such a large number of dimples on the surface of the body 2 reduces air resistance applied to the lure 1 when being shot. It is thus possible to provide the lure 1 that can fly farther away.

The body 2 is a member that can float by itself on the water (regardless of fresh water or salt water).

The specific gravity of the body 2 is not particularly limited as long as it is less than 1. The specific gravity of the body 2 is preferably 0.9 or less, more preferably 0.8 or less and particularly preferably 0.6 or less.

The body 2 is made of a nonmagnetic material.

In the specification of the present application, such a nonmagnetic material is defined as not having magnetism on its own and being not magnetized even when coming close to a magnet (in other words, the material is not attracted to a magnet). On the other hand, a magnetic material is defined as being magnetized when coming close to a magnet (in other words, the material is attracted to a magnet). A magnet is defined as having its own magnetic field with no supply of external magnetic flux or electric current (having the property of attracting a magnetic material).

There is no particular limitation to the material for the body 2. Examples of the material include hard synthetic resin such as ABS resin, soft synthetic resin such as urethane, synthetic resin foam such as urethane foam, wood, and a composite material including two or more raw materials.

The body 2 may be in a hollow state or a solid state. Such a solid body 2 does not have a cavity inside the body 2.

As shown in FIG. 2, the body 2 according to an embodiment has a cavity 22 inside thereof (in other words, being hollow state). Because the body 2 is provided with the cavity 22 inside thereof, the body 2 can be easily produced so as to have a specific gravity of 0.9 or less even when the material for the body has a specific gravity exceeding 1 (such as ABS resin). The body 2 in a hollow state can be made of, for example, hard synthetic resin.

The body 2 is further provided therein with the sinker moving spatial portion 3. The sinker moving spatial portion 3 has a long and narrow cylindrical shape and extends in the anteroposterior direction of the body 2. The sinker moving spatial portion 3 may have a vertical sectional shape that is not particularly limited, as long as the spherical sinker 5 accommodated in the sinker moving spatial portion 3 is smoothly movable in the anteroposterior direction (extending direction) of the sinker moving spatial portion 3. In the present embodiment, a sectional shape of the sinker moving spatial portion 3 is a substantially square shape as shown in FIG. 3. Alternatively, a sectional shape of the sinker moving spatial portion 3 may be a substantially circular shape and the like.

The sinker moving spatial portion 3 corresponds to a space surrounded with a plurality of walls provided in the body 2. Each of the plurality of walls is made of a nonmagnetic material.

The sinker moving spatial portion 3, which has a substantially square shape in a vertical sectional view, is a space surrounded with paired upper and lower walls 31 and 32, and paired left and right walls 33 and 34. The upper and lower walls 31 and 32 extend in the anteroposterior direction of the body 2, respectively. The left and right walls 33 and 34 extend in the anteroposterior direction of the body 2, and are interposed between the upper wall 31 and the lower wall 32. Each of the upper wall 31, the lower wall 32, the left wall 33, and the right wall 34 has a flat surface.

These walls 31, 32, 33, and 34 are molded integrally with the body 2 in many cases (therefore, the walls and the body 2 are made of a same material). Alternatively, the sinker moving spatial portion 3 may be formed by molding the respective wall members separately from the body 2 and joining the wall members to the inner surfaces of the body 2.

Furthermore, each surface of the left wall 33 and the right wall 32 and/or each surface of the upper wall 31 and the lower wall 32 may be provided with rails projecting respectively as necessary in the same manner as the above mentioned lure according to the conventional art (rails are not shown). These rails are formed as long projection that extends in parallel with a central axis of the sinker moving spatial portion 3 in the same manner as the above mentioned lure according to the conventional art.

The body 2 is usually made of a plurality of molded parts. For example, the body 2 may be formed by joining left and right symmetrically halved molded parts. The body 2 thus obtained by joining such paired halved molded parts is preferred, because the cavity and the sinker moving spatial portion 3 can be provided easily in the body 2.

The body 2 is provided with an annular line coupler 41 that projects from the front end of the body 2 and allows a line (fishing line) to be fastened thereto.

The body 2 is also provided with an annular fishhook coupler 43 that projects from the rear end of the body 2 and locks a fishhook. The body 2 is further provided with a similar annular fishhook coupler 44 that projects substantially from the center of the trunk of the body 2. Fishhooks 42 each having a hooked shape (such as treble hooks) are locked to the fishhook couplers 43 and 44, respectively.

The body 2 is provided with a water flow resistance plate 45 that projects from the lower portion of the head of the body 2. The water flow resistance plate 45 projects integrally from the body 2. The water flow resistance plate 45 serves to swing the lure 1. More specifically, when the lure 1 is pulled in the water, the flow of water hits the water flow resistance plate 45 has a function to swing the lure 1.

The partition 7 is provided at the front portion of the sinker moving spatial portion 3. The partition 7 is interposed between the sinker moving spatial portion 3 and the retainer 6. This partition 7 is located such that the rear surface of the partition 7 is in contact with a surface of the retainer 6. Alternatively, the partition 7 may be located on the surface of the retainer 6 while maintaining the gap (not shown).

The partition 7 is preferably made of a material that does not inhibit transmittance of magnetic force. The material for forming the partition 7 is not particularly limited. The material for forming the partition 7 is preferably a nonmagnetic material or a magnetic material, and more preferably a nonmagnetic material. In the present embodiment, the partition 7 is molded integrally with the body 2 (therefore, the partition 7 and the body 2 are made of a same material). Alternatively, the partition 7 may be formed separately from the body 2 and installed at the front portion of the sinker moving spatial portion 3.

The partition 7 has an inclined surface portion 8. The inclined surface portion 8 is a part of the partition 7 and is gradually reduced in thickness from the sinker moving spatial portion 3 toward the center of the retainer 6.

In the present embodiment, the partition 7 is provided with a circular hole 9, and the inclined surface portion 8 is continuously provided so as to surround the circular hole 9. More specifically, the partition 7 has the inclined surface portion 8 that has a ring shape in a front view and is gradually reduced in thickness toward the center of the partition, and the circular hole 9 that is opened inside the inclined surface portion 8 so as to be surrounded therewith. As shown in FIG. 3, the inclined surface portion 8 preferably has a substantially circular ring shape in a front view. In the specification of the present application, the shape in a front view is obtained when the inclined surface portion is seen from the sinker moving spatial portion along the normal line of the partition.

The retainer 6 is located on the rear surface side of the partition 7. Accordingly, the center of the surface of the retainer 6 is exposed from the hole 9 of the partition 7.

When the spherical sinker 5 moves to the front portion of the sinker moving spatial portion 3, the spherical sinker 5 is fitted into the inner area of the inclined surface portion 8 of the partition 7 (the area surrounded with the inclined surface portion 8), and is brought into contact with the surface of the inclined surface portion 8. Furthermore, the spherical sinker 5 is attached to the surface of the retainer 6, which is exposed from the hole 9, due to the magnetic force.

The retainer 6 is provided at the front side of the sinker moving spatial portion 3.

The partition 7 is provided, on the rear surface side thereof, with a case 21 that accommodates the retainer 6. The retainer 6 is fitted into the case 21.

The retainer 6 attracts the spherical sinker 5 and retains the spherical sinker 5 at the front portion of the sinker moving spatial portion 3. In the present embodiment, in which the spherical sinker 5 is made of a magnetic material, the retainer 6 is made of a magnet (a permanent magnet). Examples of the magnet include a ferrite magnet, an alnico magnet, magnet steel, a resin magnet, and a gum magnet. The resin magnet is obtained by molding resin mixed with metal or the like. The gum magnet is obtained by molding gum mixed with metal or the like. In a case where the retainer 6 is made of a gum magnet, the impact and impact noise generated can be mitigated when the spherical sinker 5 hits the retainer 6.

The retainer 6 is not particularly limited in terms of the shape thereof, and may be in a plate shape having a predetermined thickness, for example.

The spherical sinker 5 is accommodated in the sinker moving spatial portion 3 so as to be movable therein. As described above, the sinker moving spatial portion 3 has a long and narrow cylindrical shape and extends in the anteroposterior direction of the body 2. The spherical sinker 5 is movable in the anteroposterior direction of the sinker moving spatial portion 3.

The spherical sinker 5 is obtained by forming, into a spherical shape, a magnetic material that has a large specific gravity. The specific gravity of the spherical sinker 5 is not particularly limited as long as it is large enough relative to that of the body 2. The specific gravity of the spherical sinker 5 is preferably 6 or more, and is more preferably 7 or more.

There is no particular limitation to the magnetic material. Typical examples of the magnetic material include iron group metal such as iron, nickel, or cobalt; an alloy including such iron group metal; and an oxide of such iron group metal. Such a magnetic material has a specific gravity of 6 or more and has strong magnetism. Therefore, the magnetic material is preferred as the material for the spherical sinker 5. For example, the spherical sinker 5 is made of a steel ball.

The spherical sinker 5 of a different size is accommodated in the sinker moving spatial portion 3 in accordance with the buoyancy set to the lure 1. A diameter (size) of the spherical sinker 5 is not particularly limited, but is usually about 2 mm to 15 mm and preferably about 3 mm to 10 mm.

In the present embodiment of the lure 1, two spherical sinkers 5 are accommodated in the sinker moving spatial portion 3. Alternatively, only one or more than three spherical sinkers may be accommodated in the sinker moving spatial portion (not shown). In such a case where a plurality (two, or three or more) of spherical sinkers are accommodated therein, these spherical sinkers are configured identically in many cases. Alternatively, some or all of these spherical sinkers may be configured differently from each other.

In the case where the plurality of spherical sinkers 5 are accommodated in the sinker moving spatial portion 3, the respective spherical sinkers 5 move in the sinker moving spatial portion 3 while being aligned in line in the anteroposterior direction of the sinker moving spatial portion 3.

The spherical sinker 5 at the front is attached to the retainer 6 due to the magnetic force. On the other hand, the spherical sinker 5 at the rear is attached to the spherical sinker 5 at the front due to the magnetic force. In other words, a plurality of spherical sinkers 5 are aligned and retained in the retainer 6 by a magnetic force of the retainer 6 influencing the spherical sinker 5 at the rear through the spherical sinker 5 at the front that is attached to the retainer 6.

The lure 1 described above is used in the state where a line is fastened to the line coupler 41. When the lure 1 is shot, the spherical sinker 5 is moved to the rear portion of the sinker moving spatial portion 3 due to inertia. The center of gravity of the lure 1 is thus shifted backward so as to be closer to the rear portion of the lure 1, so that the lure 1 can fly far away with the rear portion of the lure 1 being positioned in front. On the other hand, when the lure 100 reaches the surface of water, the spherical sinker 5 moves toward the front portion of the body 2. The spherical sinker 5 is retained in the front portion of the body 2 by a magnetic force of the retainer 6 (see FIG. 2). In this manner, the center of the gravity of the lure 1 is shifted to the front portion by retaining the spherical sinker 5 on the surface of the partition 7. When the lure 1 is pulled in this state, the lure 1 swims with the rear portion being swinging to the left and right.

The lure 1 according to the present invention is provided with the partition 7 that has the inclined surface portion 8 and is located between the retainer 6 and the front portion of the sinker moving spatial portion 3. The inclined surface portion 8 is tapered and is gradually reduced in thickness from the sinker moving spatial portion 3 toward the center of the retainer 6. When the spherical sinker 5 moves to the front of the sinker moving spatial portion 3, the spherical sinker 5 is fitted into the inner area of the inclined surface portion 8. The surface of the spherical sinker 5 is brought into contact with the surface of the inclined surface portion 8, and the spherical sinker 5 is attached to the retainer 6 due to the magnetic force. While the spherical sinker 5 is in contact with the surface of the inclined surface portion 8, the spherical sinker 5 is supported by the inclined surface portion 8 and is therefore unlikely to move. Therefore, it prevents displacements of the spherical sinker 5 attached to the retainer 6 in the right-left direction and/or up-down direction while the lure 1 is swimming.

Furthermore, the lure 1 according to the present invention allows the spherical sinker to be fitted into the inner area of the inclined surface portion 8 regardless of the diametrical size of the spherical sinker, i.e. a large or small diameter. Therefore, the present invention can prevent displacement in the right-left direction of any spherical sinker, even when a spherical sinker of a large diameter or a spherical sinker of a small diameter is optionally selected and accommodated in the sinker moving spatial portion 3 that has a unique shape (in other words, the body 2 having a unique shape). As described above, the present invention does not need a plurality of sinker moving spatial portions 3 that are formed differently so as to be adapted to the spherical sinkers 5 of various sizes. Therefore, reduction is achieved in terms of the production cost for the lure 1.

The lure according to the present invention is not limited in configuration to that of the above embodiment, but the configuration of the lure can be modified in various manners. Mainly described below are the portions configured differently from those of the above embodiment. There will be no reference to the portions configured similarly to those of the embodiment described above, and same terms and same reference signs are applied to such similar portions.

Figure 5:
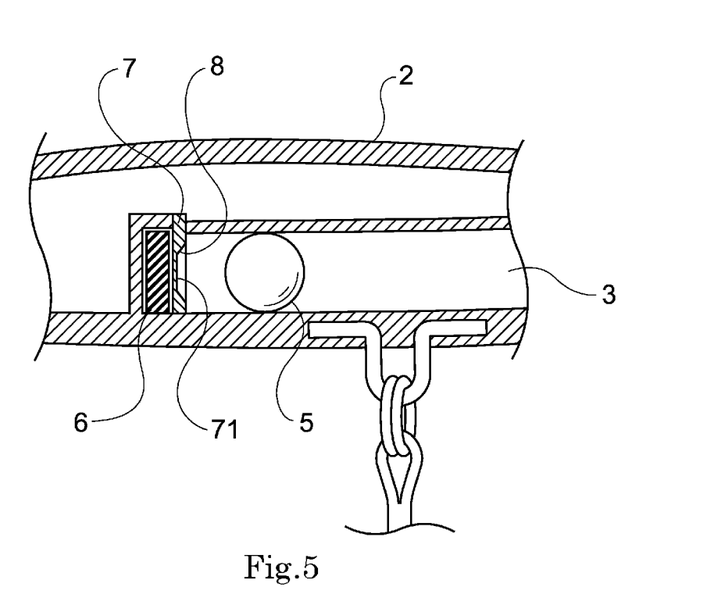
FIG. 5 is an enlarged view showing a partition and the periphery thereof according to another embodiment of the present invention.

The partition 7 according to the above embodiment is provided with the circular hole 9. Alternatively, the partition 7 may not be provided with such a hole. For example, as shown in the embodiment illustrated in FIG. 5, the partition 7 may be provided, on the surface (facing the sinker moving spatial portion 3), with a recess 71 having a dish shape. The recess 71 has a substantially circular shape in a front view, for example. The dish-shaped recess 71 is most concave at the center thereof, and is made gradually shallower toward the outer edge of the partition in all the directions. In other words, in the case where the partition 7 is provided with the dish-shaped recess 71, the thickness of the partition 7 is the smallest at the portion corresponding to the center of the recess 71, and the peripheral portion of the thinnest portion is made gradually thicker toward the outer edge of the partition 7. This peripheral portion corresponds to the inclined surface portion 8 of the partition 7.

The inclined surface portion 8 according to the above embodiment has the substantially circular ring shape in a front view. Alternatively, the inclined surface portion 8 may have a substantially rectangular ring shape in a front view, a substantially hexagonal shape in a front view, or the like (not shown).

Figure 6:
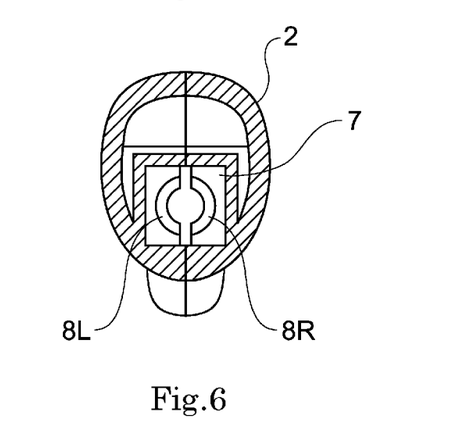
FIG. 6 is a sectional view of a lure according to still another embodiment of the present invention (taken in the direction same as that of FIG. 3).
Figure 7:
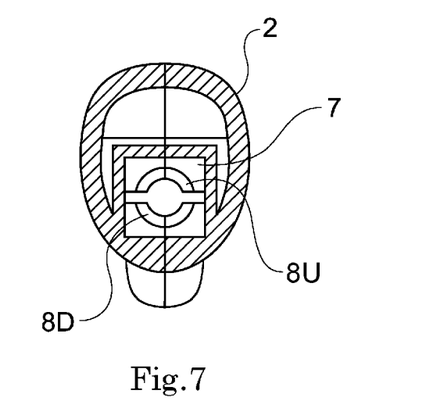
FIG. 7 is a sectional view of a lure according to still another embodiment of the present invention (taken in the direction same as that of FIG. 3).

Furthermore, the inclined surface portion 8 according to the above embodiment is formed continuously in the peripheral direction (into a ring shape in a front view). Alternatively, the inclined surface portion 8 may be provided partially in the peripheral direction. FIGS. 6 and 7 each show a state where the inclined surface portion is provided partially in the peripheral direction.

The partition 7 shown in still another embodiment illustrated in FIG. 6 is provided with paired left and right inclined surface portion 8R and 8L, which each have a substantially circular arc shape in a front view and face each other with a predetermined gap being provided therebetween.

The partition 7 shown in still another embodiment illustrated in FIG. 7 is provided with paired upper and lower inclined surface portions 8U and 8D, which each have a substantially circular arc shape in a front view and face each other with a predetermined gap being provided therebetween.

The lure shown in FIG. 6, which is provided with the inclined surface portions 8R and 8L, effectively prevents displacement of the spherical sinker 5 in the right-left direction. In contrast, the lure shown in FIG. 7, which is provided with the inclined surface portions 8U and 8D, effectively prevents displacement of the spherical sinker 5 in the up-down direction.

The lure according to the present invention is applicable to fishing of various kinds of fishes such as black basses, sea basses, dolphin fishes, octopuses, and squids.

What is claimed is:

1. A lure comprising:
a body;
a sinker moving spatial portion provided inside the body and extending in an anteroposterior direction of the body;
a spherical sinker accommodated in the sinker moving spatial portion to be movable along the sinker moving spatial portion in the anteroposterior direction of the body; and
a retainer provided at a front side of the sinker moving spatial portion, said retainer configured to magnetically attract the spherical sinker;
wherein a partition is provided between a front portion of the sinker moving spatial portion and the retainer,
the partition has a tapered surface portion that is gradually reduced in thickness from the sinker moving spatial portion toward the retainer,
the partition has a hole, and the tapered surface portion is located to completely surround and define the hole, and the spherical sinker contacts and magnetically attaches directly to the retainer through the hole, and
the spherical sinker is configured to simultaneously contact the tapered surface portion, an upper wall of the sinker moving spatial portion, and a lower wall of the sinker moving spatial portion, when the spherical sinker contacts and is magnetically attached directly to the retainer through the hole.

2. The lure according to claim 1, wherein the retainer is made of a gum magnet.

3. The lure according to claim 1, wherein
the partition comprises a pair of left and right tapered surface portions, and
the pair of left and right tapered surface portions each have circular arc shape when the tapered surface portions are viewed from the sinker moving spatial portion.

4. The lure according to claim 1, wherein
the partition comprises a pair of upper and lower tapered surface portions, and
the pair of upper and lower tapered surface portions each have circular arc shape when the tapered surface portions are viewed from the sinker moving spatial portion.

5. The lure according to claim 1, wherein said hole is a circular-shaped hole.

* * * * *